United States Patent [19]

Seidel

[11] 3,962,541
[45] June 8, 1976

[54] FREQUENCY SAMPLE-AND-HOLD CIRCUIT

[75] Inventor: Harold Seidel, Warren, N.J.

[73] Assignee: Bell Telephone Laboratories, Incorporated, Murray Hill, N.J.

[22] Filed: Feb. 13, 1975

[21] Appl. No.: 549,760

[52] U.S. Cl............................ 178/69.5 R; 328/63
[51] Int. Cl.².............................................. H04L 7/02
[58] Field of Search............... 178/53, 53.1, 69.5 R, 178/70 T; 328/15, 55, 63, 109, 110; 331/1 A, 18, 74, 76; 307/220, 269

[56] References Cited
UNITED STATES PATENTS

| | | | |
|---|---|---|---|
| 3,384,821 | 5/1968 | Beck | 328/63 |
| 3,582,795 | 6/1971 | Heick | 328/63 |
| 3,619,505 | 11/1971 | Meile | 178/69.5 |
| 3,710,262 | 1/1973 | Sorensen | 328/63 |

Primary Examiner—Benedict V. Safourek
Attorney, Agent, or Firm—S. Sherman

[57] ABSTRACT

A method and apparatus are described for reproducing the frequency of an incoming reference signal that persists for only a limited period of time. This is accomplished by counting, during the duration of the reference signal, the number of cycles of a local clock occurring between zero crossings of the reference signal, and storing the count thus obtained. After the termination of the reference signal, a secondary signal is produced whose zero crossing intervals are substantially equal to the stored count multiplied by a period of time that is defined by the local clock. Two applications of frequency sample-and-hold are described.

12 Claims, 6 Drawing Figures

FREQUENCY SAMPLE-AND-HOLD CIRCUIT

This invention relates to frequency synchronization arrangements and their use in communications systems.

BACKGROUND OF THE INVENTION

There are many situations where it is extremely important to be able to generate signals whose frequencies are highly defined. For example, the frequencies of the signals generated by the oscillators incorporated in each Bell System TOUCH-TONE telephone must fall within the passbands of the several filters located in a central office if they are to perform the dialing function for which they are intended.

One can readily design appropriate oscillators for this purpose. However, the effective design of any circuit that is to be mass-produced and subjected to a wide range of environmental conditions must go beyond the specification of a nominal circuit. It must include considerations of performance deviations due to parameter variations stemming from manufacturing tolerances and environmental changes. When this is done, one may find that the particular circuit design fails to meet the necessary requirements (See "A Monte Carlo Tolerance Analysis of the Integrated, Single-Substrate, RC, TOUCH-TONE Oscillator" by P. Balaban, B. J. Karafin and Mrs. D. B. Snyder, published in the April 1971 issue of the *Bell System Technical Journal*, pages 1263–1291).

One possible way of improving oscillator performance is to tighten the tolerance on all the oscillator components. It will be readily recognized, however, that such a procedure will tend to increase the cost of the telephone and, hence, is to be avoided if possible. Secondly, even if more carefully designed, severe environmental changes (i.e., high or low temperatures) may nevertheless cause significant changes in the signal frequencies.

A second situation wherein frequencies must be highly defined is in the area of echo cancellation. An echo occurs in a communication system when an electrical signal encounters an impedance mismatch. As a result of this encounter, the incident signal is partially reflected back towards the signal source. Because of the transmission time involved, the reflected signal, or echo, is heard some time after the incident speech was transmitted. As distances increase, the echo takes longer to reach the talker, and becomes more and more annoying. Accordingly, various means have been proposed for eliminating echoes in long distance communication systems. One such means extracts a portion of the incident signal and combines it out of phase with the reflected signal so as to produce a cancellation of the latter. The difficulty with this arrangement, however, resides in the fact that in some systems the echo signal has experienced a slight shift in frequency and, hence, cannot be readily cancelled by the echo canceller.

As is evident in both of the above-described applications, problems arise because the frequencies of interest are not synchronized relative to each other, or relative to the frequency characteristics of some circuits. This would suggest stabilizing the frequencies of interest relative to some reference frequency, and there are many circuit arrangements disclosed in the prior art for doing this. The difficulty with such an approach resides in the fact that a reference signal, as such, is not presently available in the telephone system. However, there are standardized signalling tones which emanate from the central offices. The problem is that these signalling tones are only available for short periods of time.

Accordingly, it is a first object of the present invention to synchronize a frequency by means of a reference signal of short duration.

It is a more specific object of the invention to use available signalling tones for frequency synchronization within the existing telephone network.

SUMMARY OF THE INVENTION

Frequency synchronization, in accordance with the present invention, is obtained by means of a frequency sample-and-hold circuit wherein a local signal is compared to a reference signal during the brief period of time the reference is available. Information derived from this comparison is then stored in a memory which persists until a new reference signal is received. The stored information is used to generate a secondary signal whose frequency is related to the reference signal. In those cases where the reference signal is intermittent, a new comparison can be made whenever the reference signal is on, and the memory updated accordingly.

In a first application of the invention, the dial tone transmitted by a central office to each telephone subscriber is used to calibrate the subscriber's TOUCH-TONE oscillators, thus insuring that the dialing tones originating from the subscriber's telephone set fall within prescribed frequency limits, regardless of aging of components or environmental changes.

In a second application of the invention, a pair of pilot tones are used to detect any spurious frequency shift experienced by signals as they propagate through a long distance communication system. Such detection and correction of the signal frequencies are advantageously employed in connection with echo cancellation processes in telephone systems. Frequency sample-and-hold circuits are employed to measure and then store frequency information for use throughout the period of time any pair of telephone subscribers are connected.

It is an advantage of the present invention that the signals used for synchronizing purposes need only be available for limited periods of time. As a result, certain network functions can be improved without modifying the basic structure of the existing telephone system and, other functions can be added without interfering with existing telephone services.

These and other objects and advatages, the nature of the present invention, and its various features, will appear more fully upon consideration of the various embodiments now to be described in detail in connection with the accompanying drawings.

DETAILED DESCRIPTION

Figure 1:
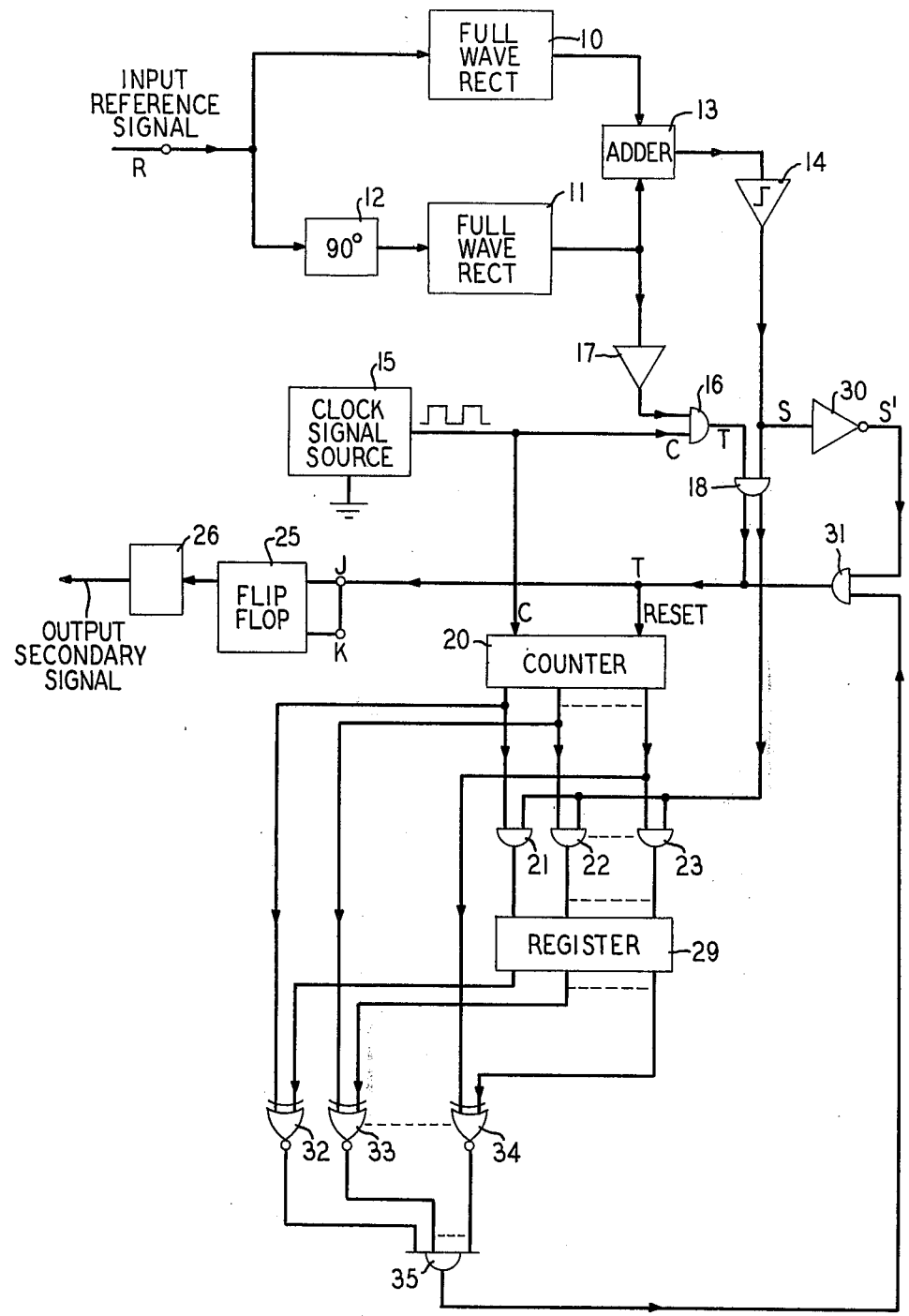
FIG. 1 shows one embodiment of a frequency sample-and-hold circuit in accordance with the present invention.

Referring to the drawings, FIG. 1 shows, in block diagram, a first embodiment of a signal generator including one embodiment of a frequency sample-and-hold circuit in accordance with the present invention. The operation of this circuit is best explained by dividing its operation into two sequential modes. The first mode in point of time is the "Learning Mode" during which information about the frequency of an incoming reference signal is ascertained. The second mode of operation which follows the first mode in time, is the "Operating Mode" during which an output signal is generated whose frequency is related, in a prescribed manner, to the reference signal which, in fact, no longer exists.

The several steps which are performed by the circuit illustrated in FIG. 1 during these two modes of operation are tabulated hereinbelow as follows:

Mode I: Learning Mode
  a. Detect presence of incoming reference signal;
  b. Identify zero crossings of reference signal with respect to a local clock signal;
  c. Count and store the number of clock pulses between zero crossings of reference signal if in Mode I operation.

Mode II: Operating Mode
  a. Count clock pulses and compare with stored count if in Mode II operation;
  b. Emit pulse whenever clock count and stored count are the same, and reset counter if in Mode II operation.

Referring once again to FIG. 1, the first step (a) of the Learning Mode is performed by the circuit comprising two full wave rectifiers 10 and 11; a 90° phase shifter 12; a signal combiner 13; and an amplifier-limiter 14. Specifically, the incoming reference signal R is coupled directly to one of the full wave rectifier 10, and is coupled to the other full wave rectifier 11 through the 90° phase shifter 12. The two full wave rectified outputs are then combined in signal combiner 13 and the resulting signal amplified and limited in amplifier-limiter 14. The output from the amplifier-limiter is a direct current signal S hich is "on" so long as the reference signal is "on," when the reference signal is "off," signal S is also "off." Thus, this circuit detects the presence of the incoming reference signal R.

To identify the zero crossings of the reference signal, as called for in step (b) of the Learning Mode, the full wave rectified signal derived from one of the full wave rectifiers 11 is coupled to an AND gate 16 through an inverter 17. Simultaneously, a clock signal C, derived from a clock signal source 15, is coupled to AND gate 16. The operation is such that each time the rectified reference signal passes through zero, AND gate 16 is enabled and passes a clock signal pulse. Thus, the output from AND gate 16 is a train of pulses T whose repetition rate is substantially equal to twice the reference signal frequency. This fulfills step (b) of the Learning Mode.

The third step (c) of the Learning Mode is accomplished by coupling the clock signal source to a counter 20 along with a reset signal which defines the counting period. The latter is derived from an AND gate 18 which couples the pulse train T derived from AND gate 16 to the reset terminal of counter 20. Because AND gate 18 is enabled so long as reference signal R is present, it is referred to as the Mode I AND gate.

One output signal from the Mode I AND gate is also coupled to a flip-flop 25, which generates an output signal whose frequency is synchronized to that of the input reference signal. In addition, a second output signal from the Mode I AND gate is coupled to a plurality of AND gates 21, 22 . . . 23 which are thereby enabled at the end of each count so as to couple the count to a register 29 wherein it is stored. The count and storage continue as long as the incoming reference signal R is present and the Mode I AND gate is enabled.

The Learning Mode is terminated when the reference signal is turned off. When this occurs, the enabling signal S is removed from the Mode I AND gate. This signal, it will be noted, had also been applied to an inverter 30, and had served to disable an AND gate 31. By its removal at the end of the Learning Mode, gate 31 is now enabled and, hence, is designated the Mode II AND gate.

The first step (a) in the Operating Mode, as indicated above, is to count the clokc pulses and compare the count with the count stored in the register. Since the clock signal source is connected directly to counter 20, the latter continues to count throughout both operating modes. However, with AND gate 18 disabled, AND gates 21, 22 . . . 23 are likewise disabled such that the count is no longer transferred to the register 29. Insteand, the count is now compared with the count stored in the register by means of a plurality of coincidence gates 32, 33 . . . 34. At coincidence, the output from the coincidence gates simultaneously enables a multiple AND gate 35 which generates an output pulse which is coupled to the Mode II AND gate 31. Since the latter is now enabled by the S' signal derived from inverter 30, the pulse thus generated by AND gate 35 is coupled to flip-flop 25 which, in turn, generates an output pulse.

It will be noted that an output pulse is generated whenever the clock count is the same as the stored count. The latter, however, was derived from the zero crossings of the input reference signal. Thus, even though the reference signal is now off, the information obtained during the Learning Mode has been retained and continues to be available throughout the Operating Mode.

The output from the Mode II AND gate also serves to reset the counter. Thus, as called for in step (b) of the Operating Mode II, a pulse is emitted whenever the clock count and the stored count are the same.

The output pulse train thus produced will have the same repetition rate as the last applied reference signal. If a different frequency reference signal is applied, the circuit will go through a new Learning Mode; a new count will be stored in the register; and a different frequency secondary signal will be produced during the following Operating Mode.

In the description hereinabove, it was stated that the pulse repetition rate of the signal T derived from AND gate 16 is "approximately" equal to twice the frequency of the reference signal. If the reference signal and the clock signal are harmonically related, the system will be synchronous and the frequency of signal T will be exactly twice the reference frequency. If the two signals are not harmonically related, the system is asynchronous, and there may occasionally be some slight difference in the time between adjacent pulses. However, the clock pulse rate will typically be very much higher than the reference signal frequency (i.e., mHz compared to a few hundred Hz) and, hence, the percent error will be negligibly small.

The amplitude of the signal derived from inverter 17 is advantageously adjusted so that only one clock pulse is gated through AND gate 16 at each zero crossing. If, however, more than one clock pulse tends to be gated through, a flip-flop circuit, or the like, that is responsive to only the first of these multiple pulses can be inserted between gates 16 and 18.

The output signal from flip-flop 25 has substantially the same frequency as the reference signal. It is apparent, however, that a frequency divider or multiplier 26 can be employed to produce an output secondary signal having some arbitrary relationships with respect to the reference signal frequency.

Figure 2:
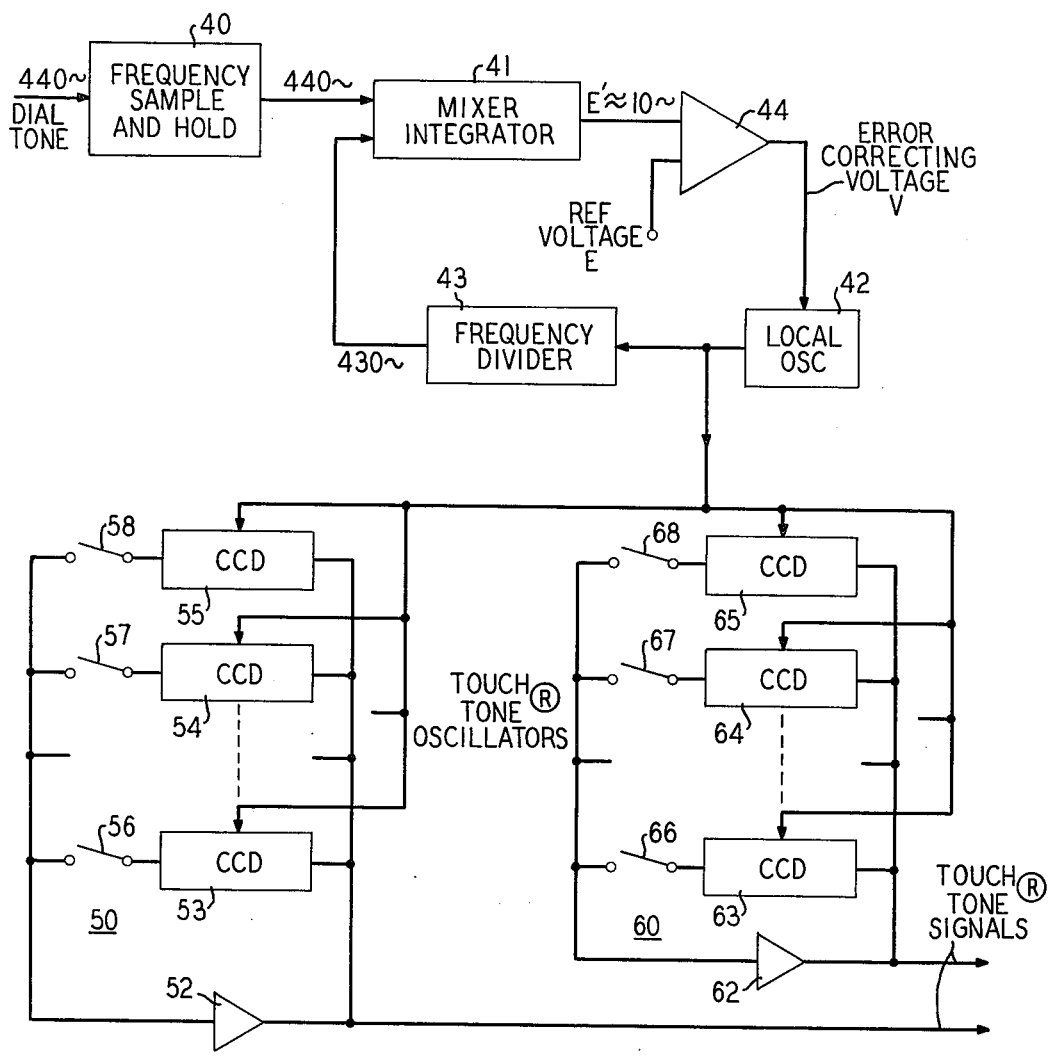
FIG. 2 illustrates the use of frequency sample-and-hold circuits in conjunction with TOUCH-TONE oscillators.

FIG. 2, now to be considered, illustrates the use of a frequency sample-and-hold circuit in conjunction with the TOUCH-TONE generators used in telephone sets. As indicated hereinabove, the frequencies of the signals generated by the TOUCH-TONE generators must fall within the passband of the filters located in the central office if proper dialing is to be realized. At present, each telephone set has its own oscillators which must all be carefully designed to produce the proper signals. In an alternative arrangement, in accordance with the embodiment of FIG. 2, the TOUCH-TONE oscillators in all telephone sets are synchronized to a common signal which emanates from the central office. Specifically, one of the two frequency components of the dial tone is used as the input reference signal applied to a frequency sample-and-hold circuit. An output controlled by the latter is used, in turn, to synchronize the TOUCH-TONE generators. Thus, in the circuit shown in FIG. 2, the output from a frequency sample-and-hold circuit 40 is coupled to one of the input ports of a frequency mixer-integrator 41. The other input port of mixer 41 is coupled to the output port of a frequency divider 43 which derives its input signal from a local oscillator 42.

The output from mixer 41 is coupled to a differential amplifier 44 along with a direct current reference signal E derived from a direct current reference source (not shown).

The local oscillator output signal is also used as the synchronizing signal for the TOUCH-TONE oscillators. For purposes of illustration, each of the TOUCH-TONE oscillators is of the type described in U.S. Pat. No. 3,824,413 comprising an amplifier and a delay line feedback loop. Since two tones are associated with each pushbutton on the TOUCH-TONE telephone, two separate oscillators 50 and 60 are shown. Furthermore, each of the oscillators has associated with it a number of different feedback loops which, for purposes of illustration, are identified as charge coupled devices (CCD). Thus, oscillator 50 includes an amplifier 52 and a plurality of feedback loops made up of CCDs 53, 54, and 55. Switches 56, 57, and 58 in the respective feedback loops are normally open. Similarly, oscillator 60 includes an amplifier 62 and a plurality of feedback loops made up of CCDs 63, 64, and 65. Switches 66, 67, and 68 in the respective loops are also normally open. Clock pulses from local oscillator 42 are applied to and Control the CCDs.

Operation of the circuit is initiated when the telephone customer raises the handset and goes "off hook." One of the components of the dial tone received from the central office is filtered out and applied to the frequency sample-and-hold circuit 40. This isolated tone is applied to the latter circuit until the customer starts the dialing operation at which time the applied dial tone is cut off, thus terminating the Learning Mode and initiating the Operating Mode. As explained hereinabove, during the Learning Mode the frequency sample-and-hold circuit has determined the frequency of the applied dial tone component. During the Operating Mode, after the dial tone is cut-off, it will continue to generate an output signal at this same frequency.

The output of the frequency sample-and-hold circuit is coupled to mixer-integrator 41 along with a signal derived from frequency divider 43. Typically, local oscillator 42 will operate in the megahertz band. The frequency divider divides this frequency down to something near that of the received dial tone. For example, if as indicated in FIG. 2, the dial tone component used is equal to 440 Hz, the output from frequency divider 43 might be about 430 Hz. These two frequencies, when applied to mixer-integrator 41, produce a ten Hertz difference frequency signal which, in turn, is converted to an output voltage that is proportional to the difference frequency.

The output voltage thus produced is coupled to differential amplifier 44 along with reference voltage E. If the local oscillator frequency is "correct," the output voltage from the mixer-integrator will be equal to the reference voltage E and a zero error correcting voltage will be generated. If, on the other hand, the frequency of the local oscillator is either too high or too low, a voltage imbalance will exist at the input to amplifer 44 and a corresponding correcting voltage V will be produced. The latter serves to restore the local oscillator to the correct frequency.

The output signal from the local oscillator is also coupled to each of the CCDs in the TOUCH-TONE oscillators. Each of the CCDs has a number of cells N such that $$NT = t/2 \qquad (1)$$

where
T is the period of the local oscillator signal; and
t is the period of the TOUCH-TONE signal.

Thus, as the subscriber presses a pushbutton on his telephone, the associated switch is closed in each of the oscillators 50 and 60, causing the appropriate TOUCH-TONE signals to be generated. Since the frequency of each of these signals is directly controlled by the frequency of the local oscillator, and inasmuch as the frequency of the latter is synchronized with the dial tone received from the central office, the frequencies of the resulting TOUCH-TONE signals are always highly defined, and remain so regardless of parameter changes in the oscillator circuit.

Figure 3:
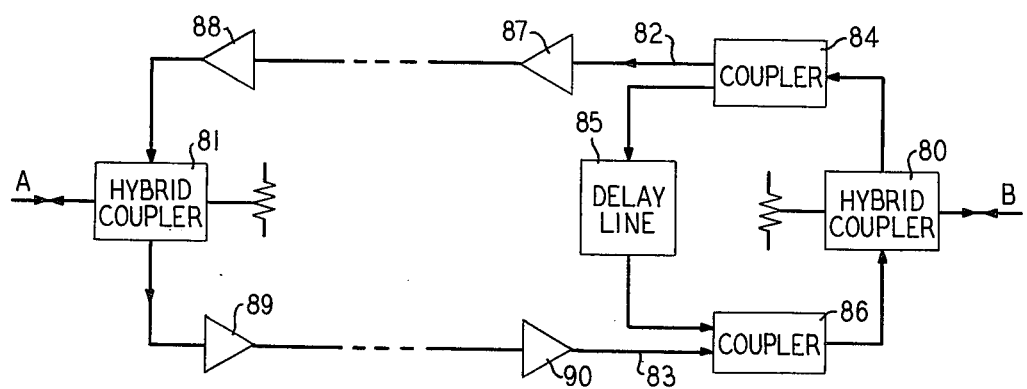
FIGS. 3, 4 and 5 show the use of frequency sample-and-hold circuits in connection with echo cancellation in telephone systems.
Figure 4:
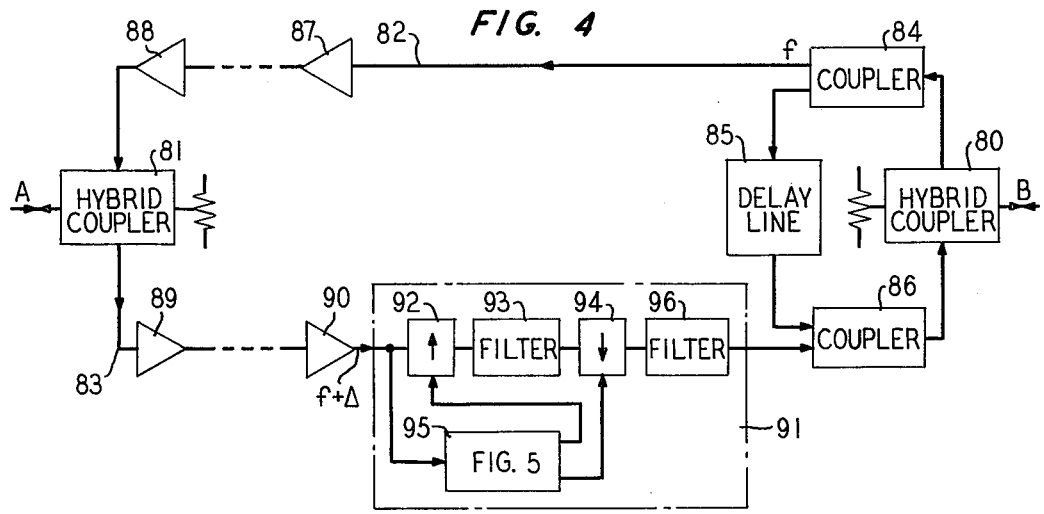
Figure 5:
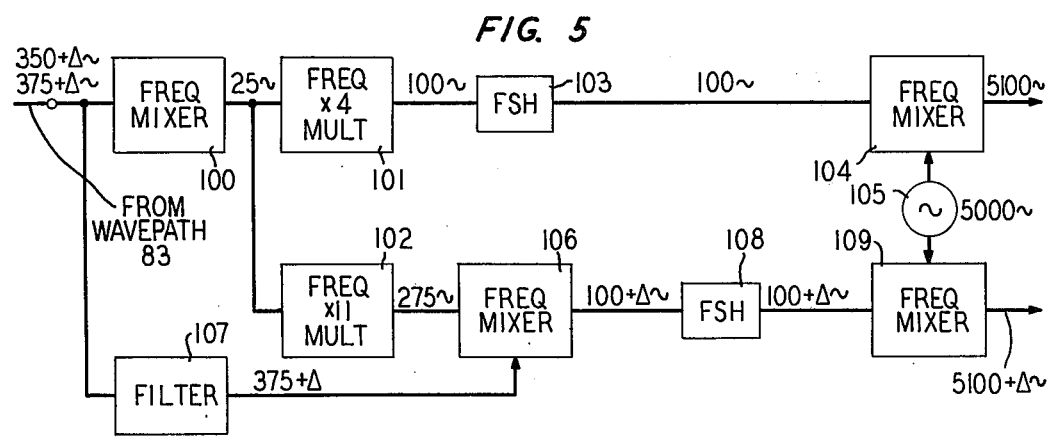

FIGS. 3, 4 and 5, now to be considered, show the application of a frequency sample-and-hold circuit to the problems associated with echo cancellation in telephone systems. As indicated above, an echo is produced when an electrical signal encounters a discontinuity in its transmission path and is partially reflected. This is indicated in FIG. 3 which is a simplified block diagram of a signal transmission system interconnecting two telephone subscribers A and B. In operation, a signal originated by subscriber B is coupled by means of a first hybrid coupler 60 along wavepath 82, which includes therealong repeaters 87 . . . 87, to a second hybrid coupler 81 and on to subscriber A. In the absence of any discontinuities in the system, none of the signal from B would be reflected back to B. As a practical matter, however, some reflection does occur and is transmitted back to subscriber B along wavepath 83, which also includes therealong repeaters 89 . . . 90.

One known way of eliminating the reflected component is to couple a portion of the signal out of wavepath 82, delay it an appropriate amount of time, and then introduce it into wavepath 83 out of time phase with the reflected signal. Various means for doing this are well known in the art and are represented in FIG. 3 by coupler 84, delay line 85 and coupler 86.

All echo cancellers operate upon the assumption that the reflected signal components are at the same frequencies as the incident signal components. There, are however, some systems (i.e., suppressed carrier, single side and systems) where the frequencies of the reflected signal components can be shifted an amount $\Delta$. Thus, if an incident signal component has a frequency $f$, the reflected signal component, as indicated in FIG. 3, will have a frequency $f+\Delta$, and complete echo cancellation will not be achieved. Accordingly, in the embodiment of FIG. 4 means are advantageously included for detecting this shift and for introducing a compensating frequency translation so as to restore the signal to its original frequency.

Using the same identification numerals as in FIG. 3, the circuit of FIG. 4 includes hybrid couplers 80 and 81, interconnected by means of wavepaths 82 and 83. Echo cancellation is achieved by means of couplers 84 and 86, and delay line 85. Also included in FIG. 4 is the frequency translating circuit 91 which includes a two-tone local oscillator 95, an up-converter 92, a bandpass filter 93, a down-converter 94, and a bandpass filter 96.

The two-tone local oscillator 95 shown in greater detail in FIG. 5 comprises a first frequency mixer 100 whose output is coupled to a pair of frequency multipliers 101 and 102. The output from multiplier 101 is coupled to a first frequency sample-and-hold circuit 103 which, in turn, is coupled to a second frequency mixer 104 along with a signal from a local oscillator 105.

The output from multiplier 102 is coupled to a third frequency mixer 106 along with a component of the input signal selected by a filter 107. The output from frequency mixer 106 is coupled to a second frequency sample-and-hold circuit 108 which, in turn, is coupled to a fourth frequency mixer 109 along with a signal from local oscillator 105.

The two output signals from mixers 104 and 109 are coupled, respectively, to up-converter 92 and down-converter 94, as shown in FIG. 4.

As indicated above, the purpose of network 91 is to determine any frequency shift experienced by the reflected signal component and to compensate for it. In order to sence the frequency shift, a pair of pilot tones are briefly sent out of the central office served by subscriber B. For purposes of illustration, the frequencies of these two tones are 350 Hz and 375 Hz. After traversing the two wavepaths 82 and 83, a component of each of these two pilot tones will arrive at the input to network 91 shifted in frequency an amount $\Delta$. Thus, the input signals to frequency mixer 100 and to filter 107 are shown to include frequencies $350+\Delta$ and $375+\Delta$. These are applied to mixer 100 which produces an output signal at the difference frequency which is independent of the magnitude of the shift $\Delta$. This 25 Hz signal is applied to multiplier 101 wherein it is multiplied by a factor of four. The resulting 100 Hz signal is then applied to frequency sample-and-hold circuit 103.

Simultaneously, the 25 Hz signal is coupled to multiplier 102 wherein it is multiplied by a factor of eleven, producing a 275 Hz output signal which is coupled to frequency mixer 106. Also applied to mixer 106 is the $375+\Delta$ Hz tone which has been isolated from the input signal by means of filter 107. The resulting difference frequency signal at $100+\Delta$ Hz, produced by mixer 106, is applied to the second frequency sample-and-hold circuit 108.

Because of the presence of the frequency sample-and-hold circuits, the pilot tones only need be transmitted for a brief period of time. After they are turned off, the sample-and-hold circuits will continue to generate the 100 and the $100+\Delta$ Hz tones which are up-converted by means of mixers 104 and 109 to 5100 Hz and $5100+\Delta$ Hz signal S. These signals are generated so long as subscribers B and A are connected to each other and, in conjunction with converters 92 and 94 serve to compensate for any frequency shift in the network. For example, any frequency component $f$, originating at station B and returning to station B at a frequency $f+\Delta$, is mixed with the 5100 Hz signal in up-converter 92 to produce a sum frequency signal at $(5100+f+\Delta)$Hz. The latter signal is, in turn, mixed with the $5100+\Delta$ Hz signal to produce a difference frequency signal $f$ at the output of down-converter 94. Filters 93 and 96 at the output of the respective converters serve to select the appropriate frequency bands of interest.

Having compensated for the frequency $\Delta$, the reflected signal component is now at the same frequency as the original signal, and echo cancellation can be achieved.

SUMMARY

A method and apparatus are described for reproducing the frequency of an incoming reference signal that persits for only a limited period of time. This is accomplished by counting, during the duration of the reference signal, the number of cycles of a local clock occurring between zero crossings of the reference signal, and storing the count thus obtained. After the termination of the reference signal, a secondary signal is produced whose zero crossing intervals are substantially equal to the stored count multiplied by a period of time that is defined by the local clock.

In the illustrative embodiment, the same clock is used during both the Learning Mode and the Operating Mode. Alternatively, a first clock can be used during the Learning Mode, and a second clock, operating at a different frequency but synchronized with said first clock, can be used to generate the secondary signal during the Operating Mode.

Figure 6:
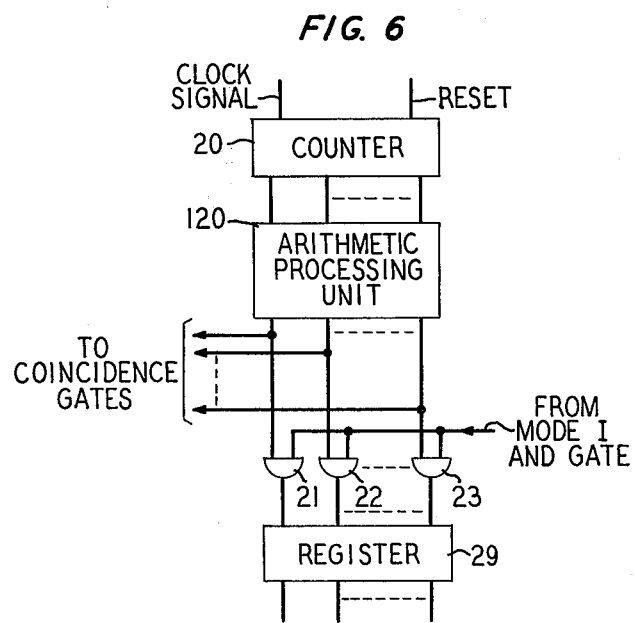
FIG. 6 shows a modification of the embodiment of FIG. 1 including an arithmetic processing unit disposed between the counter and the register.

In the illustrative embodiment, the stored count is used directly to generate the secondary signal. Alternatively, a rational multiple of the stored count can be used to define the frequency of the secondary signal. For example, FIG. 6 shows a portion of the frequency sample-and-hold circuit of FIG. 1 modified to include an arithmetic processing unit 120 disposed between counter 20 and register 29. In this arrangement the count stored in counter 20 is coupled to unit 120 wherein a related rational multiple of the count is generated. The latter, in turn, is stored in the register. The fundamental frequency of the resulting secondary signal is, therefore, a rational multiple of the reference signal.

Thus, in all cases it is understood that the above-described frequency sample-and-hold circuits are illustrative of but a small number of the many possible specific embodiments of the invention. Similarly, the described uses of frequency sample-and-hold circuits are merely illustrative of the many specific applications of the principles of the invention. Numerous and varied other arrangements can readily be devised in accordance with these principles by those skilled in the art without departing from the spirit and scope of the invention.

What is claimed is:

1. A method of generating a secondary signal whose fundamental frequency is a function of the frequency of an incoming reference signal of limited time duration, comprising the steps of:
    counting and storing, during the duration of said reference signal, the number of cycles of a local clock occurring between zero crossings of said reference signal;
    and, after the termination of said reference signal, producing a secondary signal whose zero crossing intervals are substantially equal to a rational multiple of the store count multipled by a period of time defined by said local clock.

2. A signal generator comprising:
    a frequency sample-and-hold circuit in accordance with claim 1 for sampling an incoming reference signal and generating a secondary signal;
    a local oscillator;
    means for comparing said secondary signal frequency with a rational multiple of said local oscillator frequency and producing a voltage that is a function of the frequency difference therebetween;
    feedback means for utilizing said voltage to control the frequency of said local oscillator;
    and signal generating means, responsive to the frequency of said local oscillator, for producing an output signal.

3. The signal generator according to claim 2 wherein said signal generating means comprises:
    an amplifier;
    a plurality of different feedback loops, each of whose delay time is controlled by said local oscillator;
    and switching means for selectively coupling a different one of said feedback loops between the output and input ports of said amplifier thereby forming an oscillator.

4. In a communication system including a first transmission line for transmitting a signal to a distant station, and a second transmission line for receiving signals from said distant station, a frequency translating circuit disposed in said second transmission line comprising:
    a first frequency mixer for receiving a pair of input signals $f_1+\Delta$ and $f_2+\Delta$ and forming a difference frequency signal $f_1-f_2$, where $\Delta$ is a small number relative to $f_1$ and $f_2$;
    first and second frequency multipliers for multiplying said difference frequency signal and forming two signals having frequencies $n(f_1-f_2)$ and $m(f_1-f_2)$, where $n$ and $m$ are different integers;
    means for coupling said $n(f_1-f_2)$ hertz signal to a first frequency sample-and-hold circuit in accordance with claim 1 and producing a continuous output signal at frequency $n(f_1-f_2)$;
    means for coupling said $m(f_1-f_2)$ hertz signal to a second frequency mixer along with input signal $f_1+\Delta$ to form a difference signal $f_1 + \Delta - m(f_1-f_2)$;
    where $$f_1 + \Delta - m(f_1-f_2) = n(f_1-f_2) + \Delta$$

or $$m + n = \frac{f_1}{f_1 - f_2};$$

means for coupling said $n(f_1-f_2) + \Delta$ hertz signal derived from said second mixer to a second frequency sample-and-hold circuit in accordance with claim 1 and producing a continuous output signal at frequency $n(f_1-f_2) + \Delta$;
    means for coupling said first frequency sample-and-hold circuit to a third frequency mixer along with a signal from a local oscillator to produce a first sum frequency output signal $F + n(f_1-f_2)$, where F is the frequency of said local oscillator;
    means for coupling said second frequency sample-and-hold circuit to a fourth frequency mixer along with a signal from said local oscillator to produce a second sum frequency output signal $F + n(f_1-f_2) + \Delta$;
    means for coupling said first sum frequency signal to a fifth frequency mixer disposed along said second transmission line for up-converting a received signal at a frequency $f+\Delta$ to a frequency $n(f_1-f_2) + f + \Delta$;
    and means for coupling said second sum frequency signal to a sixth frequency mixer along with said up-converted signal to produce a difference frequency output signal $f$.

5. A frequency sample-and-hold circuit for generating a secondary signal whose fundamental frequency is a function of the fundamental frequency of an incoming reference signal of limited time duration comprising:
    a clock signal source;
    means for counting and storing, during the duration of said reference signal, the number of cycles of said clock signal source occurring between zero crossings of said reference signal;
    and means for producing, following the termination of said reference signal; a secondary signal whose zero crossing intervals are substantially equal to a rational multiple of the stored count multiplied by a period of time defined by said clock source.

6. A frequency sample-and-hold circuit comprising:
    a clock signal source;
    a counter;
    a register;
    means for coupling said clock signal source to said counter;
    means for sensing the presence of an incoming reference signal;
    means for generating a reset pulse at each zero crossing of said reference signal;
    means for coupling said reset pulse to said counter;

means for transferring the accumulated count in said counter to said register coincident with the occurrence of each reset pulse;

means for sensing the absence of an incoming reference signal;

and means for generating a secondary signal whose fundamental frequence is a rational multiple of the fundamental frequency of said reference signal as defined by the count stored in said register.

7. The frequency sample-and-hold circuit according to claim 6 wherein said means for sensing the presence of an incoming reference signal comprises:

a pair of full-wave rectifiers;

means for coupling said reference signal to said rectifiers 90° out of time phase;

means for summing the outputs from said pair of rectifiers;

and means for amplifying and limiting the output signal from said summing means.

8. The frequency sample-and-hold circuit according to claim 7 wherein said means for generating a reset pulse comprises;

a first AND gate;

a second AND gate;

means, including an inverter, for coupling the output from one of said rectifiers to one input port of said first AND gate;

the other input port of said first AND gate being coupled to said clock source;

means for coupling the output port of said first AND gate to one of the input ports of said second AND gate;

and means for coupling the output from said amplifying and limiting means to the other input port of said second AND gate.

9. The frequency sample-and-hold circuit according to claim 7 wherein said means for sensing the absence of an incoming reference signal includes an inverter coupled to the output port of said amplifying and limiting means.

10. The frequency sample-and-hold circuit according to claim 6 wherein said means for transferring the accumulated count comprises:

a plurality of AND gates;

means for coupling each output port of said counter to one of the output ports of a different one of said plurality of AND gates;

means for coupling said reset pulse generating means to the other input port of each of said plurality of AND gates;

and means for coupling the output ports of said plurality of AND gates to the input ports of said register.

11. The frequency sample-and-hold circuit according to claim 6 wherein said means for transferring the accumulated count in said counter to said register includes an arithmetic processing unit for forming a rational multiple of said count.

12. The frequency sample-and-hold circuit according to claim 6 wherein said means for generating a secondary signal comprises:

a plurality of coincidence gates, each one of which has one input port coupled to a different output port of said counter, and the other input port coupled to the corresponding port of said register;

means for coupling the output ports of said coincidence gates to the output ports of a multiple AND gate;

means for coupling the output port of said multiple AND gate to one of the input ports of an AND gate;

means for coupling the other input port of said AND gate to said means for sensing the absence of an incoming reference signal;

and a flip-flop circuit connected to the output port of said AND gate.

* * * * *